M. L. BALLARD.
Nut-Locks.

No. 137,401.

Patented April 1, 1873.

Witnesses
D. P. Cowl
Edmund Masson

Inventor.
Martin L. Ballard,
By atty. A. B. Stoughton

UNITED STATES PATENT OFFICE.

MARTIN L. BALLARD, OF CANTON, OHIO.

IMPROVEMENT IN NUT-LOCKS.

Specification forming part of Letters Patent No. 137,401, dated April 1, 1873; application filed February 26, 1873.

*To all whom it may concern:*

Be it known that I, MARTIN L. BALLARD, of Canton, in the county of Stark and State of Ohio, have invented certain new and useful Improvements in Nut-Locks; and I do hereby declare the following to be a full, clear, and exact description of the same, reference being had to the accompanying drawing making a part of this specification, in which—

Figure 1:
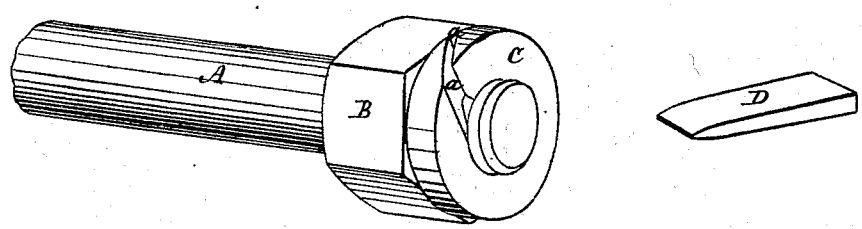
Figure 2:
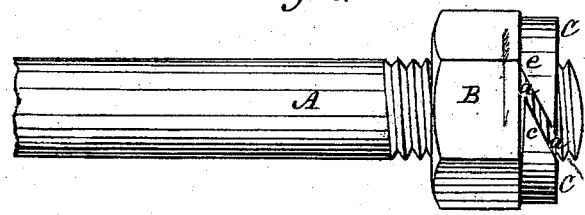
Figure 3:
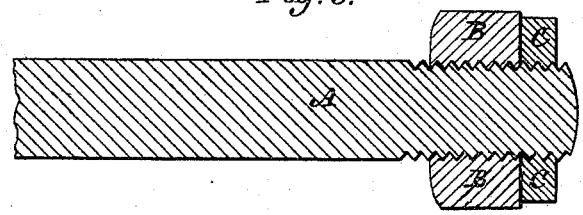

Figure 1 represents, in perspective, the end of a screw bolt or rod with a nut and nut-lock thereon, as also a wedge or such like instrument for loosening the lock, so that it can be removed or simply moved to release the nut. Fig. 2 represents a view of the bolt, nut, and nut-lock, and showing the action of the nut under strain upon the lock. Fig. 3 represents a longitudinal section through the bolt, nut, and nut-lock.

My invention consists in combining with a screw-nut a divided spring-ring, which is also threaded, and so made as that the pressure or strain upon the nut that tends to loosen it will force a portion of the threads of the nut-lock more tightly into or against the threads of the bolt or rod, and so prevent the nut from being loosened.

To enable others skilled in the art to make and use my invention, I will proceed to describe the same with reference to the drawing.

The rod or bolt A and the nut B may be of any of the ordinary kinds, and used for any of the ordinary purposes; and said rod or bolt and nut are threaded in the common way. The nut-lock C is made of steel, by preference, and in the shape of an ordinary ring, with an oblique cut or slot, *a*, through it, for a purpose to be hereafter explained, and threaded so as to run over the screw portion of the bolt or rod after the nut B has been first run on or down to its seat or bearing. One end or portion of this split or divided and threaded spring-ring, as seen at *c*, Fig. 2, is a little set away from the nut B, while the other end or portion, *e*, comes tightly and closely against the nut. The strain, pressure, or jar which loosens nuts under many circumstances would, in this case, have to turn or cause the nut to turn in the direction of the arrow, as seen in Fig. 2. Any and all tendency of the nut to turn in this direction forces the end or portion *e* of the split ring or nut-lock tightly into or against the threads of the bolt or rod and locks it there, so that it is practically impossible for the nut to move in that direction. If the nut, when under strain or pressure, were to come in contact with the other end or portion, *c*, of the nut-lock, it would spring that part away from the bolt-threads, and so loosen the nut-lock. To prevent this the portion *c*, as above stated, is cut away so that it cannot bear upon the nut B, and, consequently, the latter cannot spring it away from the rod or bolt threads.

When it is necessary to remove or start back the nut-lock on the bolt or rod a wedge or key, D, is driven into the slot *a* of the nut-lock, and this so expands the spring-ring that it can be readily backed on the rod or bolt, and so allow the nut to be run off or the bolt removed.

Having thus fully described my invention, I would state that I am aware that a threaded yoke has been used as a nut-lock; and this I do not claim; but

What I do claim is—

In combination with a bolt or rod and its screw-nut, the split, threaded, and spring ring C with its cut-away portion *c*, for forming a nut-lock, as and for the purpose described.

MARTIN L. BALLARD.

Witnesses:
G. W. ALTHOUSE,
C. F. PERKINS.